(12) United States Patent
Robinson

(10) Patent No.: US 6,551,028 B2
(45) Date of Patent: Apr. 22, 2003

(54) PIPE REPLACEMENT APPARATUS

(76) Inventor: Gerald M. Robinson, 5708 Ewart St., Burnaby, British Columbia (CA), V5J 2W7

( * ) Notice: Subject to any disclaimer, the term of this patent is extended or adjusted under 35 U.S.C. 154(b) by 0 days.

(21) Appl. No.: 09/953,554

(22) Filed: Sep. 17, 2001

(65) Prior Publication Data
US 2003/0053867 A1 Mar. 20, 2003

(51) Int. Cl.[7] ................................................. F16L 55/18
(52) U.S. Cl. ..................... 405/184.3; 405/174; 405/184; 405/184.1; 175/53
(58) Field of Search ............................. 405/154.1, 156, 405/174, 184, 184.1, 184.5; 175/53

(56) References Cited

U.S. PATENT DOCUMENTS

| | | | |
|---|---|---|---|
| 1,519,882 A | 12/1924 | Stewart et al. | |
| 1,618,368 A | 2/1927 | Dietle | |
| 2,502,711 A | 4/1950 | Evans | |
| 2,638,165 A | 5/1953 | Barber | |
| 4,505,302 A | 3/1985 | Streatfield et al. | |
| 4,626,134 A | 12/1986 | Coumont | |
| 4,637,756 A | 1/1987 | Boles | |
| 4,720,211 A | 1/1988 | Streatfield et al. | |
| 4,738,565 A | 4/1988 | Streatfield et al. | |
| 4,830,539 A | 5/1989 | Akesaka | |
| 4,848,964 A * | 7/1989 | Yarnell | 405/184.3 |
| 5,013,188 A | 5/1991 | Campbell et al. | |
| 5,094,496 A | 3/1992 | King, Sr. | |
| 5,098,225 A | 3/1992 | Rockower et al. | |
| 5,112,158 A | 5/1992 | McConnell | |
| 5,173,009 A * | 12/1992 | Moriarity | 405/184.3 |
| 5,211,509 A | 5/1993 | Roessler | |
| 5,544,977 A | 8/1996 | Cravy et al. | |
| 5,597,192 A | 1/1997 | Smith | |
| 5,642,912 A | 7/1997 | Parish, II | |
| 5,647,627 A | 7/1997 | Baessler | |
| 5,709,503 A * | 1/1998 | Manlow | 405/184.2 |
| 5,876,152 A * | 3/1999 | Hesse | 175/53 |
| 5,988,719 A | 11/1999 | Lavender | |
| 5,997,215 A | 12/1999 | Schwert | |
| 6,092,553 A | 7/2000 | Hodgson | |
| 6,149,349 A | 11/2000 | Nikiforuk et al. | |
| 6,171,026 B1 | 1/2001 | Crane et al. | |
| 6,305,880 B1 * | 10/2001 | Carter et al. | 405/184.3 |
| 6,109,832 A1 * | 8/2002 | Lincoln | 405/184 |
| 6,443,658 B1 * | 9/2002 | Lincoln | 405/184.1 |

FOREIGN PATENT DOCUMENTS

| | | | | |
|---|---|---|---|---|
| GB | 2138532 | * | 10/1984 | 405/184 |
| GB | 2213904 | * | 9/1989 | 405/184 |

* cited by examiner

Primary Examiner—Jong-Suk (James) Lee
(74) Attorney, Agent, or Firm—Hall, Priddy, Myers & Vande Sande

(57) ABSTRACT

A tool for replacing pipe, in which the existing underground pipe is fractured or cut into fragments, which are forced inward so that they pass through the tool. The tool has breaking members that extend radially outwards and backwards from a nose such that, when the tool is pulled through an existing underground pipe, the breaking members are forced against the inside of the existing underground pipe, thereby breaking it. The fragments are forced inwards by the leading edge of the cylindrical base of the tool and pass through a bore in the cylindrical base. In this way the replacement of existing underground pipe is made possible without expanding the cavity of the existing underground pipe. The tool may additionally include a pipe guide for guiding replacement pipe into place behind the tool as the tool is pulled through the existing underground pipe. The fragments pass through the pipe guide and into the replacement pipe. The tool additionally includes clearing mechanisms for removing the fragments from the replacement pipe.

6 Claims, 8 Drawing Sheets

PIPE REPLACEMENT APPARATUS

FIELD

The present invention relates to an apparatus for the replacement of underground pipe.

BACKGROUND

Underground pipes are subject to inevitable deterioration and wear and, therefore, must be replaced from time to time. An obvious method for replacing existing underground pipe with replacement pipe is to excavate the entire length of the existing pipe, remove it and place new replacement pipe into the excavation. Excavation of existing pipe is time-consuming, labor-intensive and results in damage to the area surrounding the excavation. In many instances pipes often lie beneath driveways, buildings, or gardens, and property owners are very concerned about any damage that may result thereto. In addition, excavation is often made difficult by the presence of underground utilities.

Accordingly, it is an object of the present invention to provide an apparatus and method for replacing underground pipe requiring minimal excavation.

Other devices and methods have previously been proposed for use in replacement of underground pipes and mains. For example, those disclosed in U.S. Pat. No. 6,171,026 issued to Crane et al.; U.S. Pat. No. 6,092,553 issued to Hodgson; U.S. Pat. No. 5,544,977 issued to Crane et al.; U.S. Pat. No. 4,720,211 issued to Streatfield et al.; and U.S. Pat. No. 4,738,565 issued to Streatfield et al. However, all of the devices and methods disclosed by the above patents suffer from several drawbacks.

Often the earth surrounding underground pipes is extremely hard because it has been compacted or has settled over the years that the pipes have been in the ground. Many of the tools of the prior art, such as those described in U.S. Pat. No. 4,720,211 issued to Streatfield et al., and U.S. Pat. No. 5,098,225 issued to Rockower et al., involve the movement outwards of fragments of the existing underground pipe and expansion of the cavity thereof in order to create a cavity large enough to accommodate a replacement pipe. Obviously, in very compact earth, expansion of the cavity of the existing underground pipe can be very difficult and sometimes impossible. Furthermore, such expansion can damage nearby underground utilities or surface features (e.g. where an existing pipe passes under a sidewalk the sidewalk, may be cracked by expansion of the cavity of the existing pipe). Therefore it is an object of the present invention to provide an apparatus and method for replacing underground pipe that does not cause the expansion of the cavity of the existing underground pipe. It is a further object of the present invention to provide an apparatus and method for replacing underground pipe that does not cause outward movement of fragments of existing underground pipe.

In order to replace existing underground pipe without causing expansion of the surrounding earth, it is often necessary to remove fragments of the existing underground pipe from the cavity of the existing underground pipe. Generally, the prior art tools and methods for replacing underground pipe fracture or cut the existing underground pipe in situ and draw replacement pipe into the cavity of the fractured or cut existing underground pipe. In other words the fragments of the fractured or cut existing underground pipe remain in the ground surrounding the replacement pipe, once it is drawn into place. One exception is the tool described in U.S. Pat. No. 6,171,026 issued to Crane et al., wherein the existing underground pipe is cut in two and the resulting slit pipe is drawn out of the borehole, drawing replacement pipe into place in the process. The method and apparatus of U.S. Pat. No. 6,171,026 is obviously not suitable for use with frangible or fracturable pipe. Accordingly, it is an object of the present invention to provide an apparatus and method for the replacement of both frangible and non-frangible pipes wherein fragments of the existing underground pipe are removed from the cavity thereof, thereby making it possible to replace existing underground pipe without expanding the pipe or the surrounding earth.

SUMMARY OF THE INVENTION

A tapered tool for the replacement of underground pipe is provided that has a nose smaller than the inside diameter of an existing underground pipe, a cylindrical base with an outside diameter at least as large as the outside diameter of the existing underground pipe, and a plurality of breaking members joining the nose to the base such that the breaking members are angled radially outwards from the nose to the base, such that the breaking members are forced against the inside surface of the existing underground pipe and are operative to fracture the existing underground pipe into fragments as the tool is pulled through the existing underground pipe. The edge of the base that is closest to the nose is operative to force the fragments of the existing underground pipe radially inward, such that they pass through the bore of the base.

By forcing the fragments of the existing underground pipe inwards and allowing them to pass through the tool and into the replacement pipe the tool of the present invention makes it possible to replace existing underground pipe without expanding the cavity of the existing underground pipe, thereby protecting surface features and nearby underground utilities that might be damaged by such expansion. This is especially true when the existing underground pipe is found in very hard ground. Such compact earth is not further compressed by the forces applied to expand the cavity of the existing underground pipe but instead transmits the forces directly to, for example, nearby underground utilities.

In an alternative embodiment the breaking members of the tool are curved to form a conical helix. The helical tool rotates about its axis as it is pulled through the existing underground pipe thereby breaking the existing underground pipe in a helical pattern.

In addition, the expansion of the cavity of existing underground pipes found in very hard ground requires the application of greater force and may in some instances be impossible. The use of greater force additionally results in an increased risk of tool breakage. Therefore, by not expanding the cavity of the existing underground pipe, the tool of the present invention makes possible the replacement of existing underground pipes found in very hard ground with the use of less force, with less risk of damage to nearby utilities and surface features and with less risk of tool breakage.

In an alternate embodiment of the tool of the present invention, one side of the tool comprises a curved plate and the other comprises breaking members similar to those of the first embodiment described above. The breaking members fracture the existing underground pipe and the fragments are directed radially inward and pass through the tool as described above. The curved plate results in a more even distribution of force against the side of the existing underground pipe and therefore prevents expansion of the existing underground pipe on that side. In addition, the curved plate prevents fragments and earth from one side of the existing underground pipe from entering the tool. Therefore, the embodiment incorporating a curved plate allows the replacement of existing underground pipe in hard ground while reducing the amount of debris that passes through the tool.

Trenchless pipe replacement tools, such as the tool of the present invention, are often used in conjunction with a pipe guide or other means for drawing replacement pipe into place behind the tool. When used in conjunction with a pipe guide the tool directs the fragments of the existing underground pipe radially inwards and allows them to pass through the tool, through the pipe guide and into the replacement pipe. Therefore, the present invention additionally comprises mechanisms for clearing fragments and earth from the replacement pipe.

A first embodiment of the debris clearing mechanism comprises a sprocket supported on a support member inside the pipe guide. A chain enters the replacement pipe at one end, passes through the replacement pipe to the pipe guide, where it passes over the sprocket and then back through the replacement pipe until it exits at the same end it entered. The sprocket is preferably supported so that it is vertically oriented thereby dividing the chain into a top length and a bottom length. In one embodiment the chain is a closed loop. The chain is then moved such that the top length advances through the pipe towards the sprocket and the bottom length advances through the pipe away from the sprocket. In this manner the bottom length of the chain moves fragments and earth away from the tool and clears it from the replacement pipe. In an alternative embodiment the chain has paddles or clearing members connected to the links to clear the fragments and earth more effectively.

A second embodiment of the debris clearing mechanism comprises a high-pressure jetter supported on a support member inside the pipe guide. The jetter is connected to a hose that passes through the replacement pipe to a high-pressure water source. The jetter is operative to direct a plurality of high-pressure jets towards the side of the replacement pipe at an angle such that fragments of the existing underground pipe are forced back and away from the tool and are cleared from the replacement pipe. Since many pipes, such as sewer pipes, have a gradient to allow water to naturally flow in one direction, the gradient of a pipe is utilized to aid in draining the water from the pipe and clearing the fragments. In an alternative embodiment, the jetter emits an additional jet forward towards the nose of the tool.

A third embodiment of the debris clearing mechanism comprises an auger. In a preferred embodiment the auger comprises a cable having a metal band intertwined with strands of said cable such that said band extends approximately perpendicularly from said cable in a helical manner. Alternatively, the metal band can be made of some other material, such as plastic. One end of the cable is connected to a rotatable joint supported on a support member in the pipe guide. The cable passes from the rotatable joint through the replacement pipe until it exits the replacement pipe, where the other end of the cable is connected to a rotary drive mechanism. The rotary drive mechanism turns the cable such that the helical metal band forces the fragments of the existing underground pipe away from the tool and out of the replacement pipe.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

The present invention comprises a tool for trenchless replacement of underground pipes. The tool is drawn through an existing underground pipe, in the process fracturing or cutting the existing underground pipe and drawing replacement pipe into place.

Figure 1:
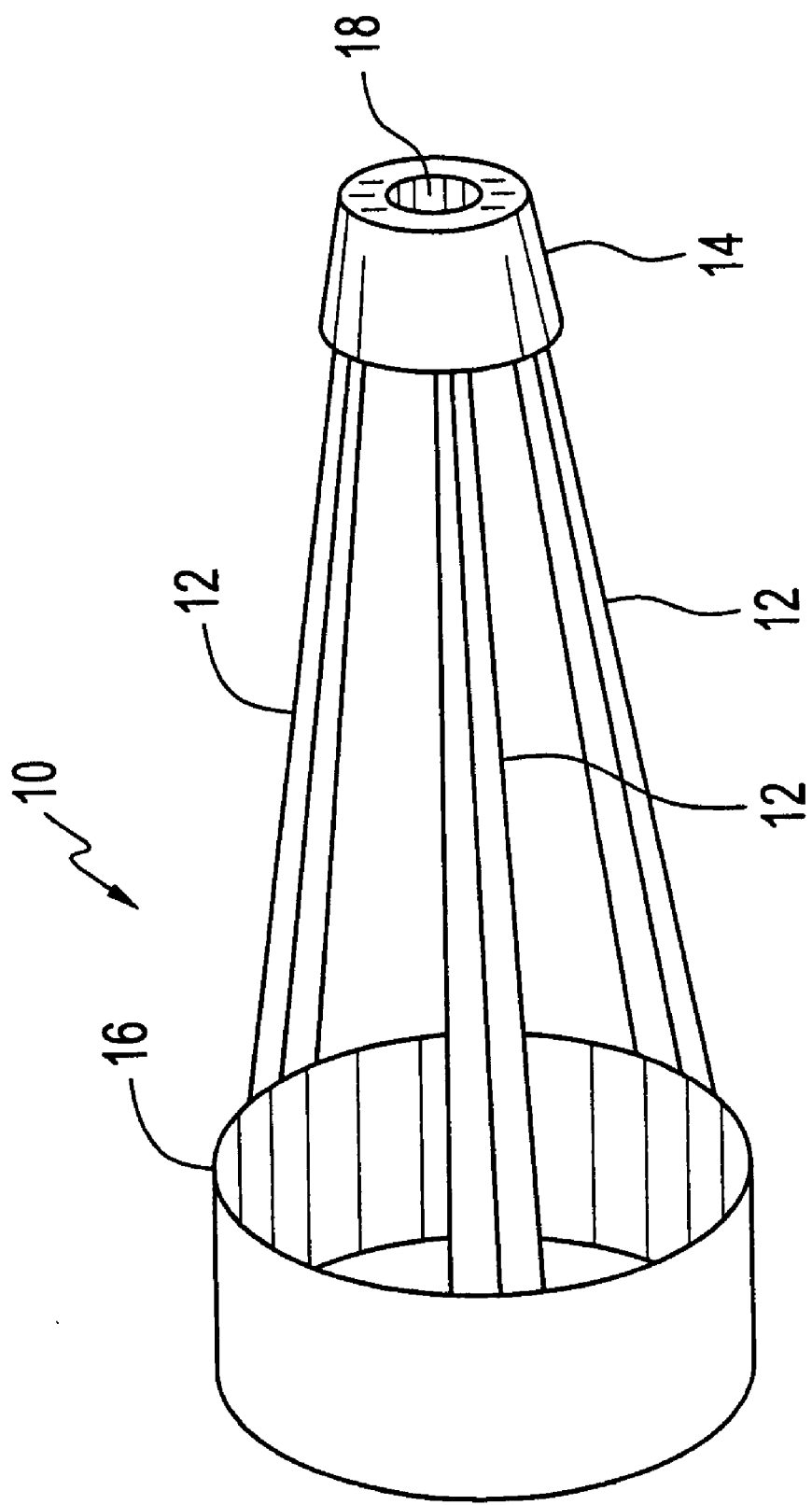
FIG. 1 is a perspective view of a breaking head of the pipe replacement tool.

Referring to FIG. 1, a breaking head 10 of the tool of the present invention is shown. The breaking head 10 comprises three breaking members 12 connecting a nose 14 and a base 16. The nose 14 has an outside diameter smaller than the inside diameter of the existing underground pipe. The base 16 has an outside diameter larger than the inside diameter of the existing underground pipe. Therefore, when the breaking head 10 is drawn through the existing underground pipe the underground pipe is broken into fragments. In alternative embodiments of the breaking head, the breaking members 12 may comprise blades, whereby the existing underground pipe is cut into fragments. The nose 14 has an eye 18 in the center for passing a pulling chain. As the breaking head 10 is drawn through the existing underground pipe, the base 16 directs fragments of the existing underground pipe inwards so that they pass through the breaking head 10.

Figure 2:
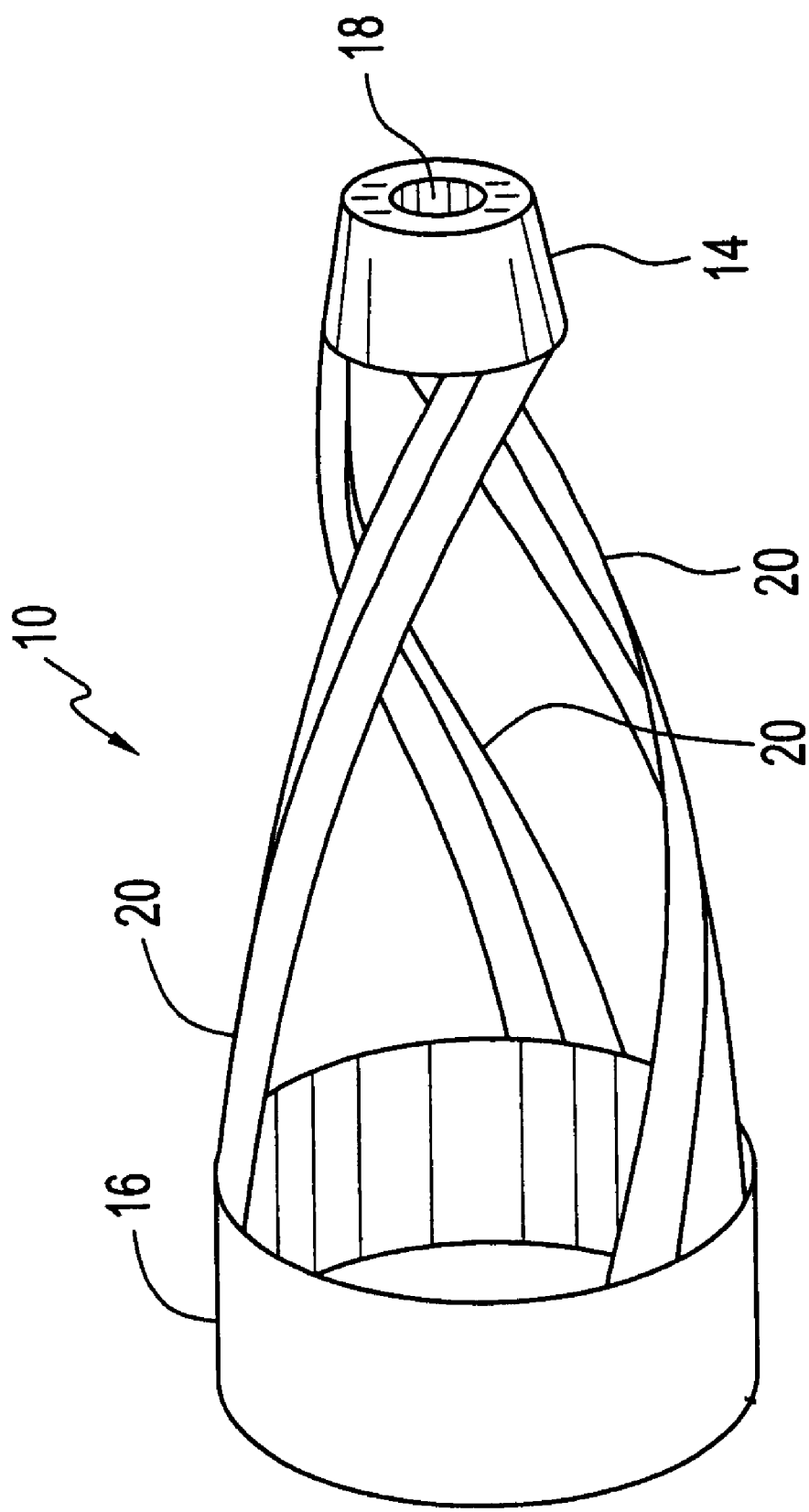
FIG. 2 is a perspective view of the breaking head of the pipe replacement tool with breaking members in helical form.

Referring to FIG. 2, an alternative embodiment of the breaking head 10 is shown, comprising helical breaking members 20. The helical breaking members 20 cause the breaking head 10 to rotate about an axis parallel to the axis of the existing underground pipe as the breaking head 10 is drawn through the existing underground pipe. Furthermore, the helical breaking members 20 result in the breaking of the existing underground pipe in a helical pattern. As with the embodiment of FIG. 1, the breaking head 10 with helical breaking members 20 has a base 16 and a nose 14 with an eye 18 for passing a pulling chain.

As the breaking head 10 is drawn through the existing underground pipe, the base 16 directs fragments of the existing underground pipe inwards so that they pass through the breaking head 10. Obviously, in an alternative embodiment of breaking head 10 wherein the helical breaking members 20 comprise blades, the existing underground pipe is cut into helical fragments as the breaking head 10 is drawn through.

Figure 3:
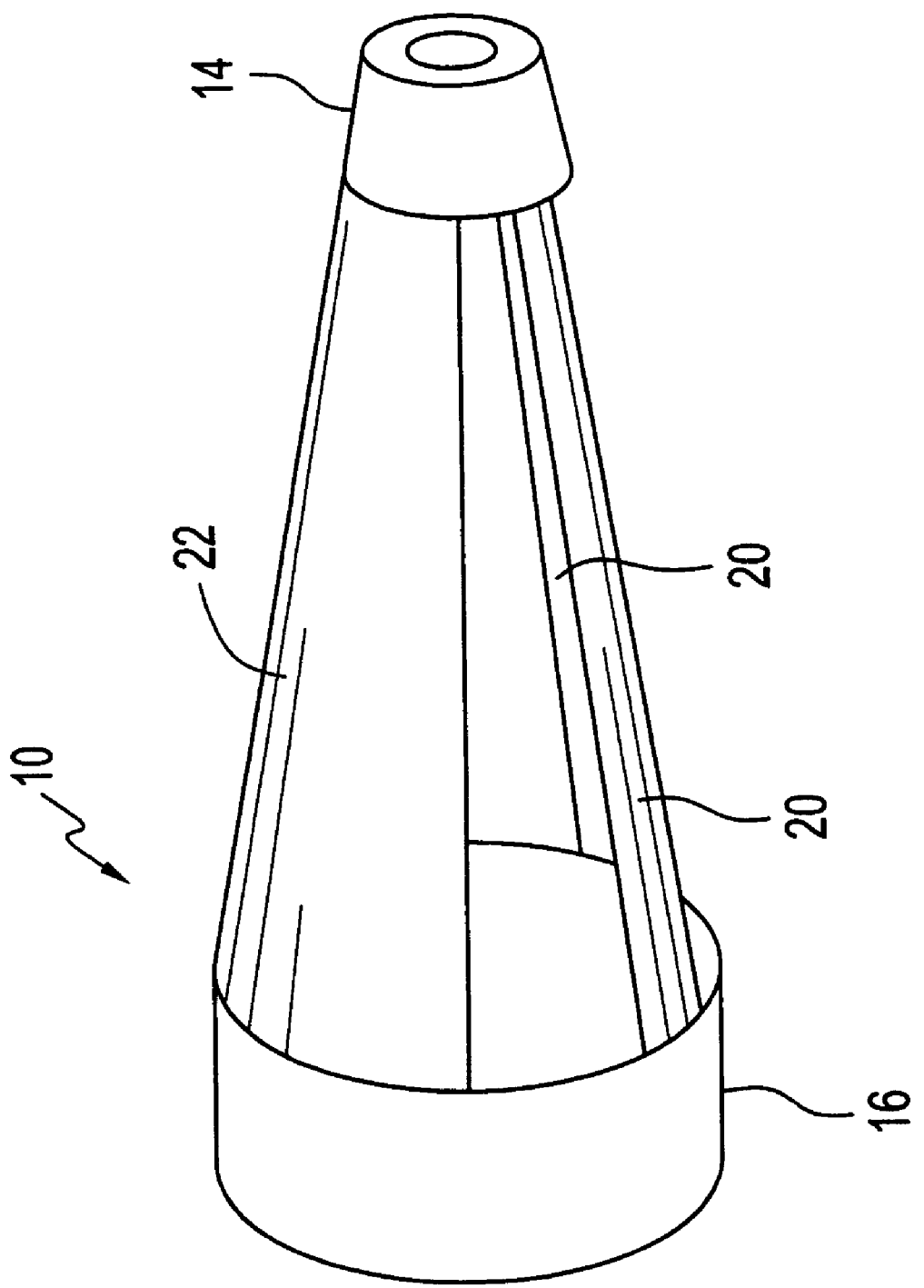
FIG. 3 is a perspective view of the breaking head of the pipe replacement tool with breaking members one side only.

Referring to FIG. 3, yet another alternative embodiment of the breaking head 10 of the present invention is shown, comprising nose 14, base 16, breaking members 20 on one side of the tool, and plate 22 on another side of the tool. In a preferred embodiment the plate 22 and the breaking members 20 are located on the top and bottom of the tool, respectively. The plate 22 is operative to prevent fragments of the top side of the existing underground pipe from entering and passing through the tool. The plate 22 also distributes the force of impact of the tool evenly against the top side of the existing underground pipe so that the top side of the existing underground pipe is only minimally expanded. Alternatively, the plate 22 and breaking members 20 could be located on the left and right sides of the tool.

Figure 4:
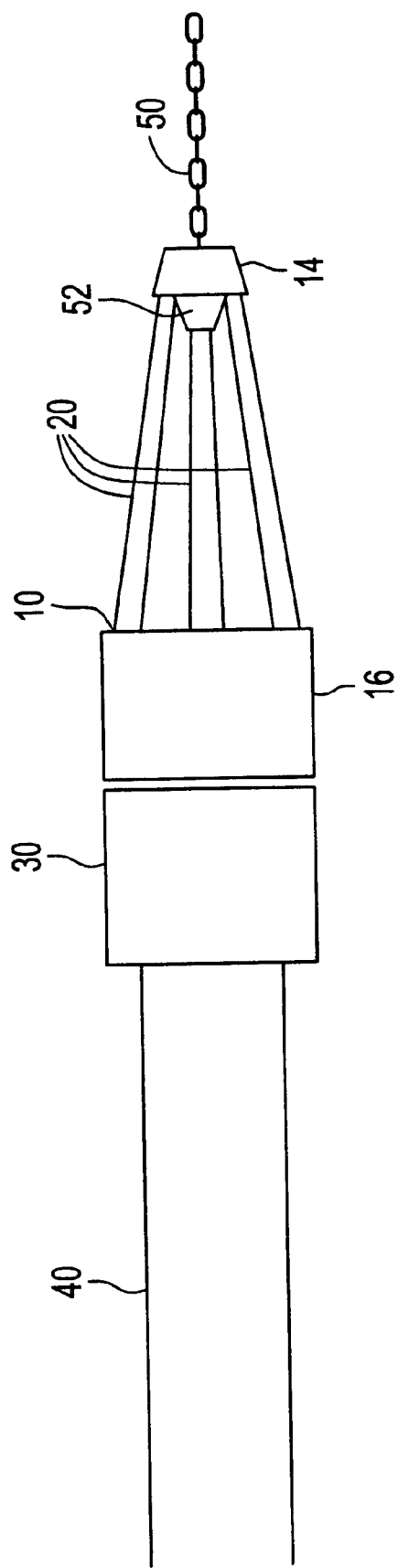
FIG. 4 is a side view of the pipe replacement tool comprising a breaking head and pipe guide.

Referring to FIG. 4, a side view of the tool 5 of the present invention is shown comprising a breaking head 10 and pipe guide 30. The pipe guide 30 is connected to the breaking head 10 such that it can be drawn through the existing underground pipe behind the breaking head 10. Also shown are replacement pipe 40, pulling chain 50, and block 52. In one embodiment the replacement pipe 40 is drawn into place behind the tool by the pipe guide 30. Alternatively, the replacement pipe 40 may be pushed into place behind the tool 5 with the pipe guide 30 acting solely to guide the replacement pipe 40 into the cavity of the existing underground pipe.

Referring to FIGS. 1, 2, 3 and 4, a pulling chain 50 is passed through the eye 18 of nose 14 and connected to a block 52. The block 52 has a size and shape such that it cannot pass through the eye 18. Therefore when tension is applied to the pulling chain 50, the block is forced against the nose 14 and the breaking head 10 is drawn forward.

Referring to FIGS. 2 and 4, in the case of the breaking head 10 comprising helical breaking members 20, the block 52 is capable of rotation about an axis parallel to the pulling chain 50. Therefore when tension is applied to the pulling chain 50, the block is forced against the nose 14 and the breaking head 10 moves forward, rotating about an axis parallel to the pulling chain, breaking the existing underground pipe into fragments in a helical pattern, without twisting the pulling chain 50. Alternatively, the nose 14 could be capable of rotation.

Again referring to FIGS. 2 and 4, in the case of the breaking head 10 comprising helical breaking members 20, the connection between the breaking head 10 and pipe guide 30 is rotatable such that the pipe guide 30 does not rotate with the breaking head 10 as they are drawn through the existing underground pipe.

Figure 5:
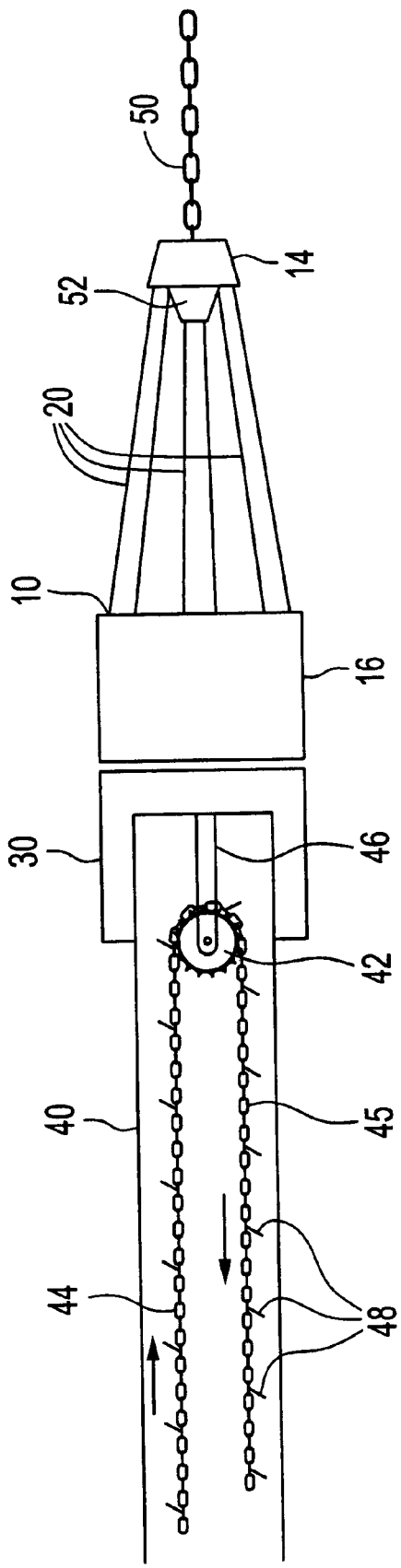
FIG. 5 is a cut-away view of a pipe replacement tool incorporating a chain and sprocket wheel for clearing earth and fragments.

Referring to FIG. 5, a side view of the tool 5 is shown with the pipe guide 30, replacement pipe 40, and a debris clearing mechanism in the form of a sprocket 42 and clearing chain with a top length 44 and a bottom length 45 for clearing fragments and earth from the interior of the replacement pipe 40. The sprocket 42 is supported on an arm 46 connected to the pipe guide 30 such that the sprocket is vertically oriented. The chain has paddles 48 connected thereto to clear fragments and earth from the replacement pipe. As the tool 5 is drawn through the existing underground pipe the breaking members 20 of the breaking head 10 fracture the existing underground pipe into fragments. The base 16 of the breaking head 10 directs the fragments into the pipe guide 30 and replacement pipe 40. The clearing chain is moved such that the top length 44 moves in the same direction as the advancement of the tool 5 through the existing underground pipe and the bottom length 45 moves in the opposite direction, thereby clearing fragments of the existing underground pipe backwards through the replacement pipe.

Figure 6:
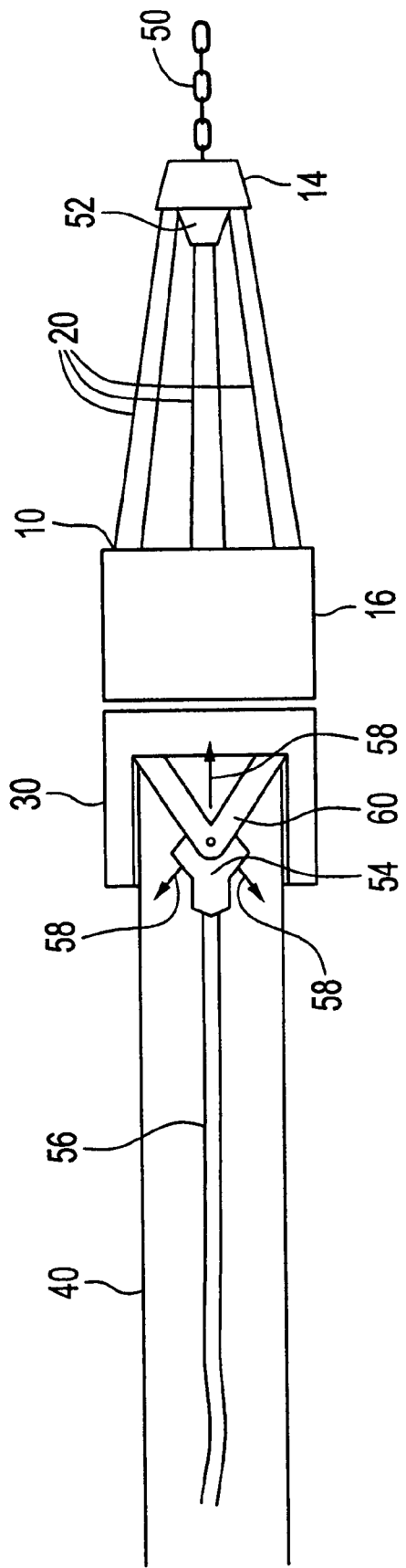
FIG. 6 is a cut-away view of a pipe replacement tool incorporating a jetter for clearing earth and fragments.

Referring to FIG. 6, a side view of the tool 5 is shown with the pipe guide 30, replacement pipe 40, and a debris clearing mechanism in the form of a high-pressure jetter 54. The high-pressure jetter 54 is supported within the pipe guide 30 by support member 60 and connected to a high-pressure water supply by hose 56. In a preferred embodiment, the jetter 54 emits a plurality of high-pressure water jets 58; one forward in the direction of travel of the tool 5 and three directed radially out and angled back to clear fragments of the existing underground pipe from the interior of the replacement pipe 40. Since many pipes have a gradient running down toward a larger pipe or main, the water emitted by the jetter 54 naturally flows down the gradient, thereby clearing the fragments of the existing underground pipe from the replacement pipe 40.

Figure 7:
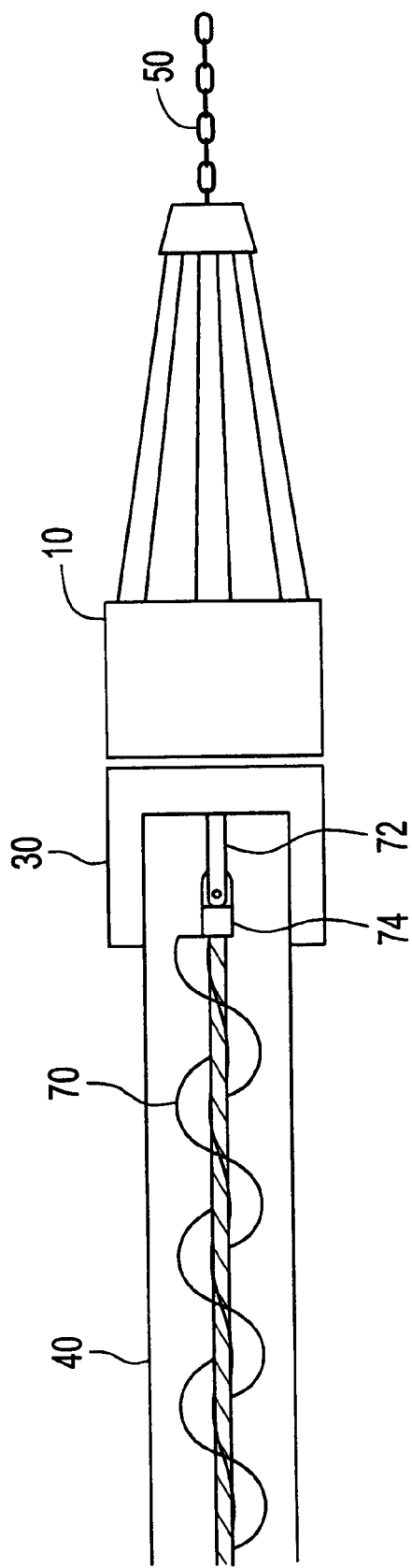
FIG. 7 is a cut-away view of a pipe replacement tool incorporating a cable with a fin for clearing earth and fragments.

Referring to FIG. 7, a side view of the tool 5 is shown with the pipe guide 30, replacement pipe 40, and a debris clearing mechanism in the form of an auger mechanism 70. In the present embodiment the auger mechanism 70 takes the form of a cable with a band wound between the strands thereof. As the auger mechanism is rotated about its axis, fragments of the existing underground pipe are moved back through the replacement pipe 40. The auger mechanism is supported and connected to the pipe guide by an arm 72 and a rotatable head 74.

Figure 8:
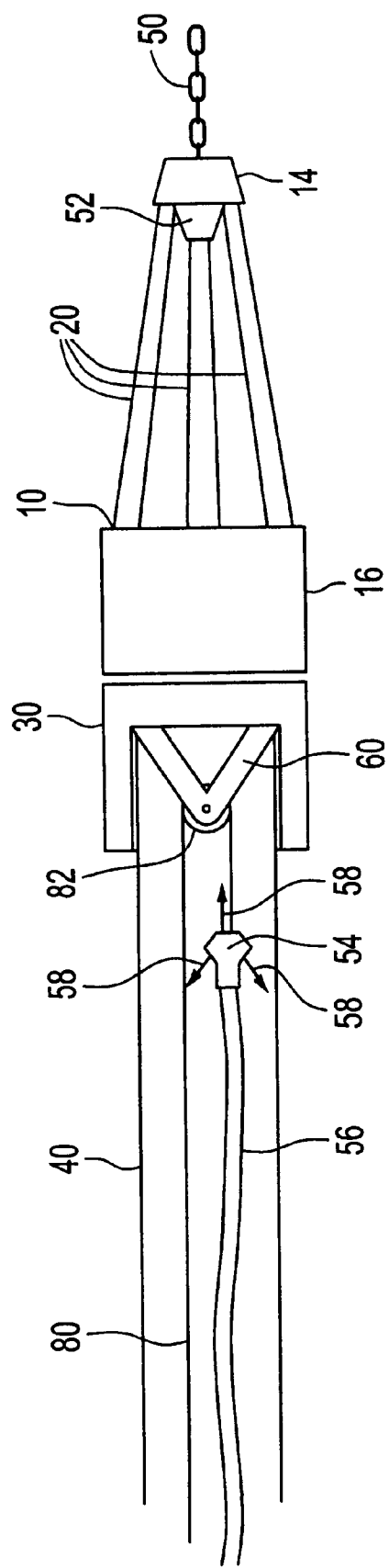
FIG. 8 is a cut-away view of a pipe replacement tool incorporating a jetter supported by a cable and pulley.

Referring to FIG. 8, an alternative embodiment of the debris clearing mechanism comprising a jetter 54. The jetter 54 is supported by the tension between a cable 80 and hose 56. The cable 80 passes through a pulley 82 and out of the replacement pipe 40. The pulley 82 is supported on a support member 60. The position of the jetter 54 can be adjusted by moving the adjustment of the tension in the cable 80. In this manner the jetter can be moved all the way back through the replacement pipe 40 thereby clearing the fragments and earth from the replacement pipe 40 completely.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A tapered tool for the replacement of underground pipe, said tool having a central longitudinal axis, wherein said tool comprises:

a) a nose having an outside diameter smaller than an inside diameter of an existing underground pipe, said nose additionally having an eye for connecting a chain thereto for pulling said tool through the existing underground pipe;

b) a cylindrical base having a central axis coincident with said central longitudinal axis of said tool, an outside diameter larger than an outside diameter of the existing underground pipe, and a bore therethrough parallel to said central longitudinal axis; and c) a plurality of breaking members joining said nose to said base;

wherein said breaking members are connected to said base and said nose such that said breaking members are angled radially outwards from said nose to said base such that said breaking members are forced against an inside surface of the existing underground pipe and are operative to fracture the existing underground pipe into fragments as said tool is pulled through the existing underground pipe, and wherein an edge of said base closest to said nose is operative to force the fragments of the existing underground pipe radially inward, and wherein said bore of said base is operative to allow the fragments of the existing underground pipe to pass through said base.

2. The tool of claim 1, wherein said breaking members are curved such that said breaking members form a tapered helix which causes said tool to rotate about its axis as it is pulled through the existing underground pipe.

3. The tool of claim 1, wherein said edge of said base closest to said nose is operative to force earth surrounding the existing underground pipe inwards so that the earth passes through said base along with the fragments as said tool is pulled through the existing underground pipe.

4. The tool of claim 1, wherein said breaking members comprise blades operative to cut the existing underground pipe into the fragments as said tool is pulled through the existing underground pipe.

5. The tool of claim 1, additionally comprising a pipe guide connected to said base such that said pipe guide is drawn through the existing underground pipe behind said base, said pipe guide having an approximately cylindrical shape and an outside diameter not larger than said outside diameter of said base, wherein said pipe guide is operative to receive a first section of replacement pipe and to guide said first section of replacement pipe into a cavity of the existing underground pipe, said pipe guide having a longitudinal bore substantially parallel to an axis of said tool, said bore operative to allow the fragments of the existing underground pipe to pass through said pipe guide and into the first section of replacement pipe as said tool is pulled through the existing underground pipe.

6. The tool of claim 5, wherein said pipe guide is removably coupled to the first section of replacement pipe such that said first section of replacement pipe and subsequent sections of replacement pipe are pulled into the cavity of the existing underground pipe behind said tool.

* * * * *